(12) United States Patent
Bellabal

(10) Patent No.: US 9,366,186 B2
(45) Date of Patent: Jun. 14, 2016

(54) LATERAL TURBOJET IMPROVED IN ORDER TO LIMIT THE DEFORMATION THEREOF

(75) Inventor: Francois Robert Bellabal, Fontainebleau (FR)

(73) Assignee: SNECMA, Paris (FR)

( * ) Notice: Subject to any disclaimer, the term of this patent is extended or adjusted under 35 U.S.C. 154(b) by 564 days.

(21) Appl. No.: 13/813,071

(22) PCT Filed: Jul. 15, 2011

(86) PCT No.: PCT/FR2011/051693
§ 371 (c)(1),
(2), (4) Date: Jan. 29, 2013

(87) PCT Pub. No.: WO2012/013889
PCT Pub. Date: Feb. 2, 2012

(65) Prior Publication Data
US 2013/0125560 A1   May 23, 2013

(30) Foreign Application Priority Data

Jul. 30, 2010   (FR) ..................................... 10 56337

(51) Int. Cl.
*F02C 7/20*   (2006.01)
*B64D 27/20*   (2006.01)
(Continued)

(52) U.S. Cl.
CPC . *F02C 7/20* (2013.01); *B64D 27/20* (2013.01); *F02K 1/80* (2013.01); *F02K 1/82* (2013.01); *F05D 2230/642* (2013.01); *F05D 2260/94* (2013.01); *F05D 2260/941* (2013.01)

(58) Field of Classification Search
CPC ............ B64D 27/20; F02C 7/20; F02K 1/80; F02K 1/82; F05D 2260/941; F05D 2230/642
See application file for complete search history.

(56) References Cited

U.S. PATENT DOCUMENTS 3,778,185 A * 12/1973 Plowman et al. .......... 415/209.4
4,266,741 A *  5/1981 Murphy ......................... 244/54
4,428,189 A    1/1984 Greenberg et al.
(Continued)

FOREIGN PATENT DOCUMENTS

EP   0 028 970      5/1981
EP   1 882 827 A2   1/2008
(Continued)

OTHER PUBLICATIONS

Combined Chinese Office Action and Search Report issued Nov. 18, 2014 in Patent Application No. 201180037105.9 (with English Translation and English Translation of Category of Cited Documents).

(Continued)

*Primary Examiner* — Carlos A Rivera
(74) *Attorney, Agent, or Firm* — Oblon, McClelland, Maier & Neustadt, L.L.P

(57) ABSTRACT

A turbojet includes an intermediate casing outer shroud connected to a front suspension and a primary structure connected to a rear suspension; the shroud and the primary structure are held in a coaxial relationship by arms with at least some of the arms being shaped and/or arranged to deform in response to thrust from the turbojet by creating a deforming torque between the shroud and the primary structure in opposition to opposing stress generated by the thrust.

13 Claims, 3 Drawing Sheets

(51) Int. Cl.
   *F02K 1/80* (2006.01)
   *F02K 1/82* (2006.01)

(56) References Cited

U.S. PATENT DOCUMENTS

| | | | |
|---|---|---|---|
| 4,441,313 A | | 4/1984 | Joubert et al. |
| 5,174,525 A | * | 12/1992 | Schilling .................. 244/54 |
| 5,224,341 A | * | 7/1993 | Munroe et al. ............ 60/226.1 |
| 5,471,743 A | * | 12/1995 | Munroe et al. ............ 29/889.3 |
| 8,733,693 B2 | * | 5/2014 | Journade et al. ............ 244/54 |
| 8,881,536 B2 | * | 11/2014 | Journade et al. ............ 60/797 |
| 9,032,740 B2 | * | 5/2015 | Journade et al. ............ 60/797 |
| 2005/0109013 A1 | | 5/2005 | Eleftheriou et al. |
| 2008/0118359 A1 | | 5/2008 | Mohan et al. |
| 2008/0124219 A1 | | 5/2008 | Kidikian et al. |
| 2009/0324400 A1 | | 12/2009 | Marini et al. |

FOREIGN PATENT DOCUMENTS

| | | |
|---|---|---|
| EP | 1 930 556 A2 | 6/2008 |
| FR | 2 928 180 | 9/2009 |
| FR | 2 940 359 | 6/2010 |
| GB | 0 021 696 | 12/1979 |
| WO | WO 2008/150213 A1 | 12/2008 |

OTHER PUBLICATIONS

International Search Report Issued Nov. 7, 2011 in PCT/FR11/51693 Filed Jul. 15, 2011.

* cited by examiner

LATERAL TURBOJET IMPROVED IN ORDER TO LIMIT THE DEFORMATION THEREOF

The invention relates to a two-stream turbojet attached to the side of a fuselage. It relates more particularly to an improvement in the connection between the intermediate casing and the primary structure carrying the propulsion chamber, the compressors, and the turbines, in order to limit deformation of the turbojet as a whole under the effect mainly of the thrust that it generates and possibly also of thermal stresses. This serves to improve the performance of the turbojet.

In an airplane fitted with side-mounted turbojets, each turbojet is attached to the fuselage by two longitudinally spaced apart suspensions: a front suspension attaching the outer shroud of the intermediate casing to the fuselage; and a rear suspension attaching the rear of the primary propulsion structure to the same fuselage. This primary structure is itself attached to the outer shroud of the intermediate casing by radial arms.

FIG. 1 is a diagram showing this type of mounting. There can be seen the fuselage 10 of the airplane carrying a turbojet 11. The turbojet comprises the fan 12 with the intermediate casing outer shroud 13, the casing of the primary structure 15, the front suspension 17, and the rear suspension 19. The rear suspension 19 is attached to a rigid rear fairing of the fan, commonly known as an outer fan duct (OFD) 21 that channels the secondary stream and that extends as far as the intermediate casing outer shroud 13 to which it is fastened. Furthermore, the rear of the OFD 21 is attached to the rear of the primary structure 15 by links that 25 that extend radially through the OFD.

In FIG. 2, arrows F1-F4 represent the various forces that are generated under the effect of the axial thrust of the engine. In particular, it can be seen that there is a lever arm between the axis along which the thrust (F1) of the turbojet is applied and the points of fastening of the front suspension 17. This configuration is responsible for a deformation phenomenon in which the turbojet as a whole takes on a "banana" shape, as shown diagrammatically. Stresses of thermal origin generally worsen this phenomenon. Curved arrow F5 symbolizes the bending moment generated on the turbojet that leads to it being deformed into a banana-shape. This is generally remedied by reinforcing the stiffness of the OFD, thus making it possible to obtain good leakage performance at the tips of the rotor blades. Nevertheless, having an OFD that is too rigid leads to a structure that is heavier, and above all it leads to loads that are very great in the event of a blade being lost.

The invention seeks to remedy all of those problems.

The invention firstly provides a two-stream turbojet for attaching laterally to the fuselage of an airplane via two longitudinally spaced apart suspensions comprising a front suspension and a rear suspension, each turbojet being the type comprising an intermediate casing outer shroud attached to said front suspension and a propulsion primary structure attached to said rear suspension, said intermediate casing outer shroud and said primary structure being held in a coaxial relationship by a set of arms, each arm having a right section that is hollow and being fastened by its ends to said shroud and to said primary structure, the turbojet being characterized in that at least some of the arms are shaped and/or arranged so as to deform in response to the thrust from the turbojet by creating a deforming torque between said shroud and said primary structure, the deforming torque having a direction opposite to the stress that is generated under the effect of the same turbojet thrust by the lever arm between the thrust axis and said front suspension.

The primary structure is attached to the rear suspension either directly or else via the OFD.

In certain embodiments, such an arm is arranged to provide coupling between shear and twisting so that the center of torsion of a right section of said arm is situated outside a midplane of the arm, on the side opposite from said front suspension relative to said midplane. Said "center of torsion" is defined below.

More precisely, such an arm may be open or it may include a slot extending laterally from the shroud to the primary structure.

In another embodiment, such an arm has a right section that is asymmetrical. For example, said section may be approximately trapezoidal. Under such circumstances, it is advantageous for said arm to be associated with a fairing for improving its streamlining.

In another possible embodiment, certain arms of such a turbojet extend radially in line with attachment points of said front suspension, while the other arms extend parallel to a corresponding radial direction on the other sides of this radial direction relative to said attachment points.

The invention also provides a subassembly constituting a turbojet intermediate casing including in particular the above-specified outer shroud and the arms for connection to said primary structure having the characteristics defined above.

The invention can be better understood and other advantages thereof appear more clearly in the light of the following description of several embodiments in accordance with its principle, given purely as examples and made with reference to the accompanying drawings, in which.

Figure 3:
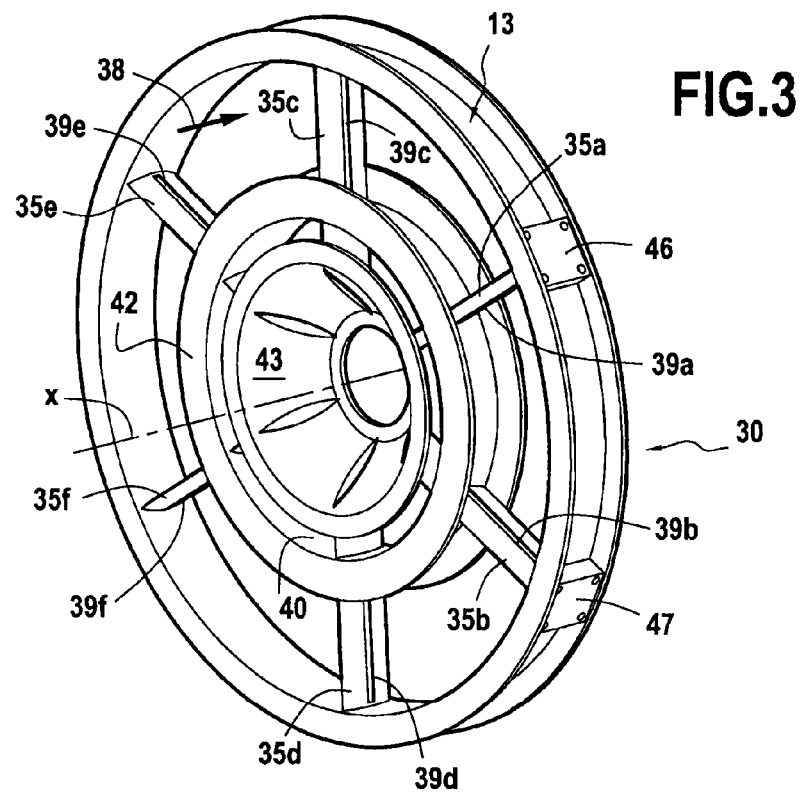
FIG. 3 shows the mounting between the outer shroud of the intermediate casing and stationary elements of the primary structure of the turbojet, in accordance with the invention.
Figure 4:
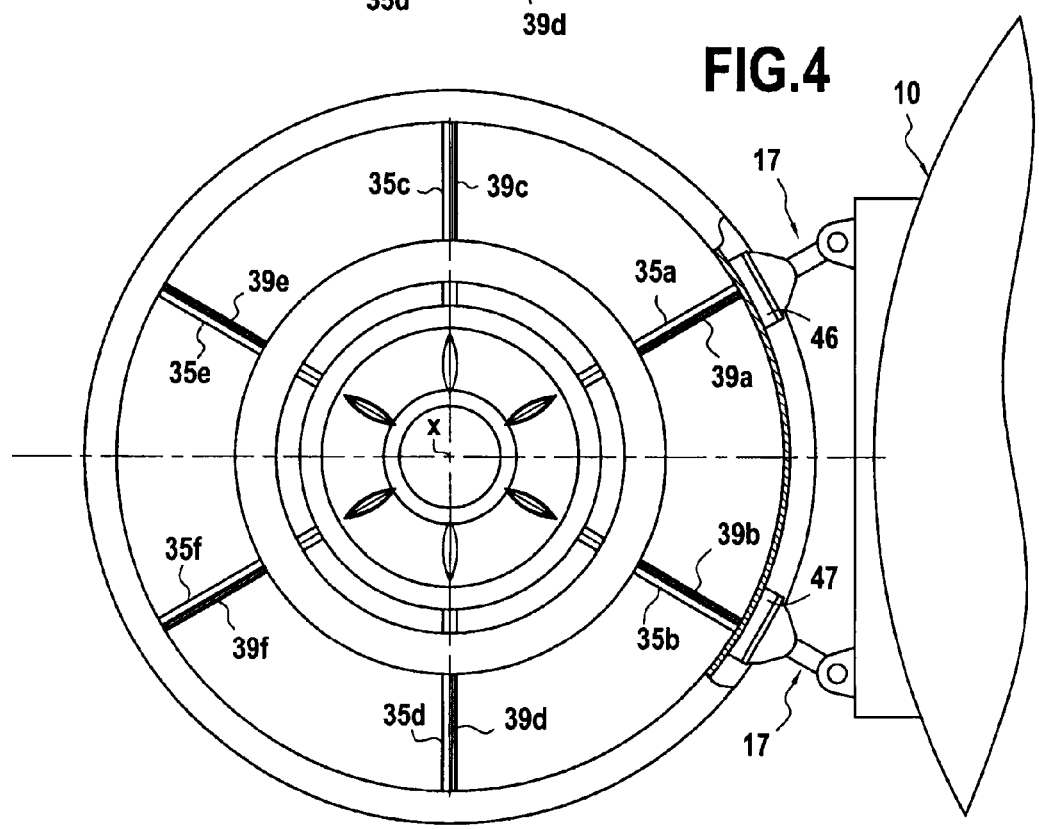
FIG. 4 is a diagram showing the attachment between the outer shroud and the fuselage of the airplane.
Figure 5:
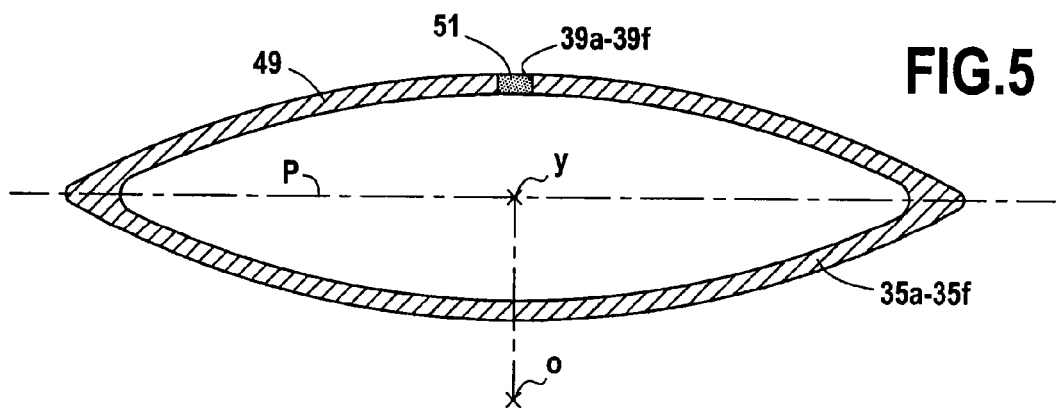
FIG. 5 is a right section of an arm of FIG. 3.

With reference more particularly to FIGS. 3 to 5, there can be seen a stationary structural portion 30 of a turbojet that is attached to the fuselage 10 and that is situated in the vicinity of the rear portion of the intermediate casing. This structural portion has an axis X. The thrust from the turbojet acts along the axis X. More particularly, there can be seen the attachment of the outer shroud of the intermediate casing 13 to the fuselage via the front suspension 17. The outer shroud of the intermediate casing is provided with radial arms 35a-35f (six arms that are regularly spaced apart circumferentially in this example) that extend mainly within the passage 38 for the cold secondary stream and that also extend into the inter-passage space 40 as defined between the inter-passage casing 42 and the hub 43 acting as a support for the front portion of the turbojet. The assembly comprising the inter-passage casing 42 and the hub 43 forms a part of the "primary" structure 15 of the turbojet. The outer shroud of the intermediate casing 13 has two connection plates 46 and 47 for connection to a front suspension for fastening along the fuselage of the airplane. These two plates lie at the ends of two adjacent radial arms 35a, 35b.

From a mechanical point of view, the arms 35a-35f may be considered as being "beams" embedded in the shroud 13.

Each arm has an almond-shaped right section that is hollow and is symmetrical about its midplane P containing the axis X.

Figure 1:
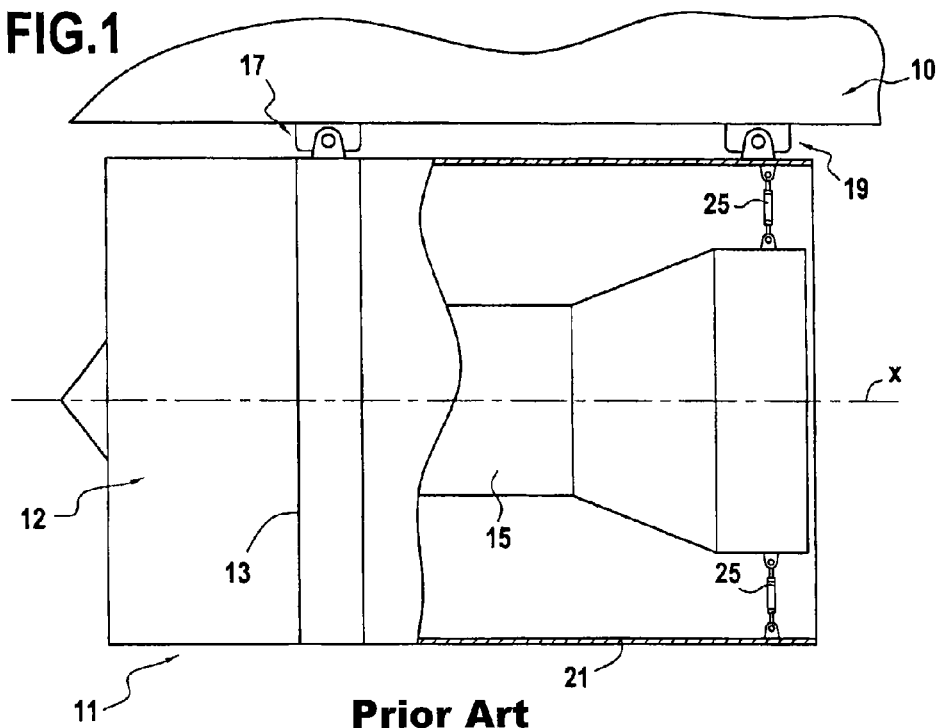
FIGS. 1 and 2 are diagrammatic views as described above showing the prior art and its problems.
Figure 2:
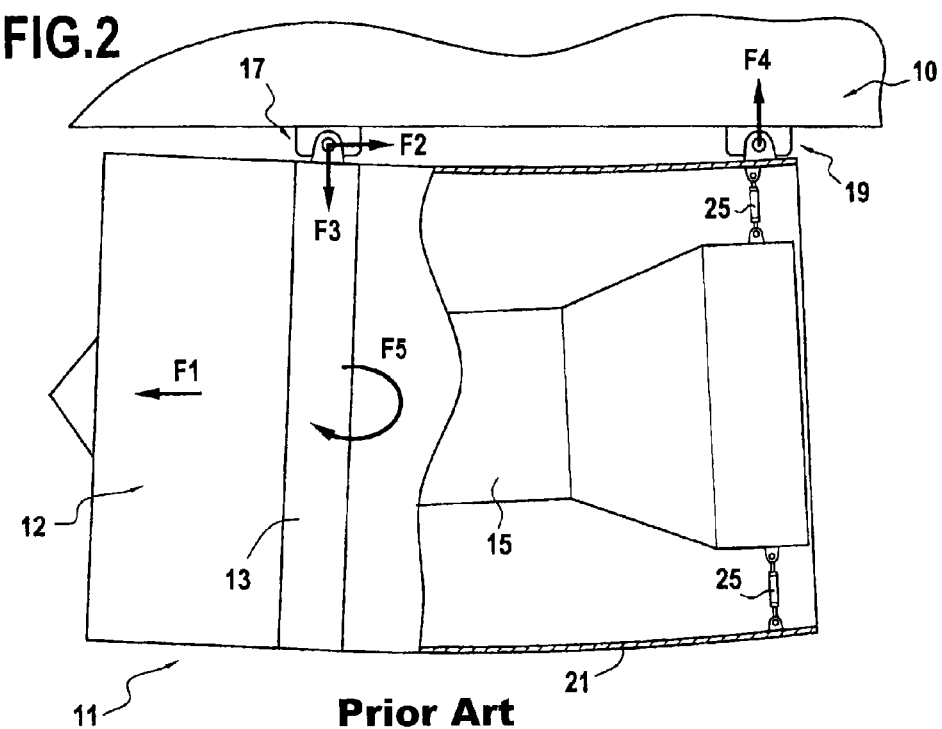

According to the invention, at least some of the arms are shaped and/or arranged to deform, in particular in response to the thrust from the turbojet, by creating a deforming torque between said outer shroud 13 and said primary structure 15, the deforming torque being in a direction opposing the stress that is generated under the effect of that turbojet thrust by the lever arm between the engine axis and said front suspension, as represented by the curved arrow F5 in FIG. 2.

In the example described, the center of torsion O in a right section of any one of the arms 35*a*-35*f* is defined as being the point where no moment is generated when a force is applied along the direction of the engine axis X. This force is generated by the thrust from the turbojet itself.

Conventionally, the symmetrical right section of such an arm is closed so that is center of torsion lies at the center of the closed right section.

In the above-defined example, the invention may also be characterized in that such an arm 35*a*-35*f* is arranged to provide coupling between shear and twisting so that the center of torsion O of a right section of the arm lies outside the midplane P of said arm, on the side remote from said front suspension relative to the front suspension 17, relative to this same midplane, containing the radial axis Y passing through the middle of the arm.

In order to offset the center of torsion O outwards in the desired direction, as shown in FIG. 3, and without necessarily changing the shape of the section, it suffices for such an arm to have a slot 39*a*-39*f* in one of its faces and extending from the shroud to the primary structure. In other words, the arm has a C-shaped right section that is open to a greater or lesser extent in order to define said slot.

It is of interest to observe that in order to obtain the deforming stress that is capable of best opposing the force tending to give rise to the "banana-shaped" deformation of the turbojet as a whole between its attachment points 17 and 19, use is made of the same causes that give rise to such deformation, namely the thrust from the turbojet and thermal stresses.

The lateral slot 39 (preferably for any of the arms) is formed in a face 49 of the arm in a plane that is tangential to the face and that is substantially parallel to the radial plane P of the arm containing the axis X of the turbojet and in such a manner that this open face that contains the slot 39 faces approximately towards the fuselage, i.e. towards the front attachment.

By way of example, it can be seen in FIG. 3 that the slots 39*a* and 39*b* of the arms 35*a* and 35*b* that are attached to the suspension 17 open so as to face each other, whereas the slots in the arms 35*e* and 35*f* that are radially in alignment therewith are open in their faces opposite to their faces facing each other in a circumferential direction. The slots 39*c* and 39*d* of the arms 35*c* and 35*d* also open out towards the attachment 17. All the deformation forces on the arms contribute to compensating for the forces that tend to give rise to the "banana-shaped" deformation of the turbojet.

As shown, the slot 39*a*-39*f* in each arm is closed by an elastomer seal 51 or the like that has no mechanical function but that serves to prevent the presence of the slot disturbing the flow.

The slots may also extend along the extensions of the arms that are situated between the inter-passage casing 42 and the hub 43.

Figure 6:
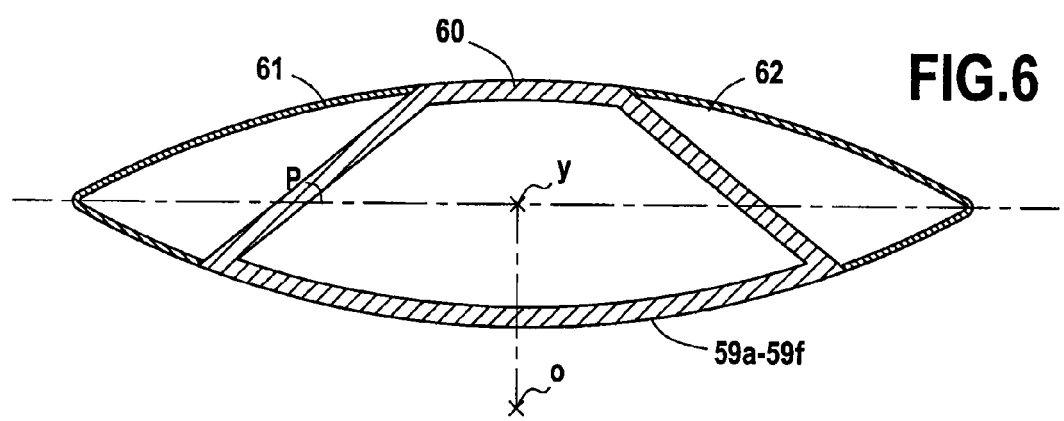
FIG. 6 is a right section analogous to that of FIG. 5, showing a variant of the arm.

Another way of obtaining a comparable result is to give such an arm 59*a*-59*f* a right section that is asymmetrical. For example, in FIG. 6, this section is approximately trapezoidal.

Under such circumstances, the face 60 defining the short side of the trapezoid replaces the face having the slot. In other words, and with reference to FIG. 3, the trapezoidal sections should be distributed in analogous manner, i.e. with the narrow small faces of the arms taking the places of the split faces.

Advantageously, under such circumstances, such an asymmetrical arm is associated with a fairing 61, 62, e.g. giving it a symmetrical almond-shaped section so as to improve its streamlining. In itself, the fairing is not stiff enough to have any influence on the position of the center of torsion O.

Figure 7:
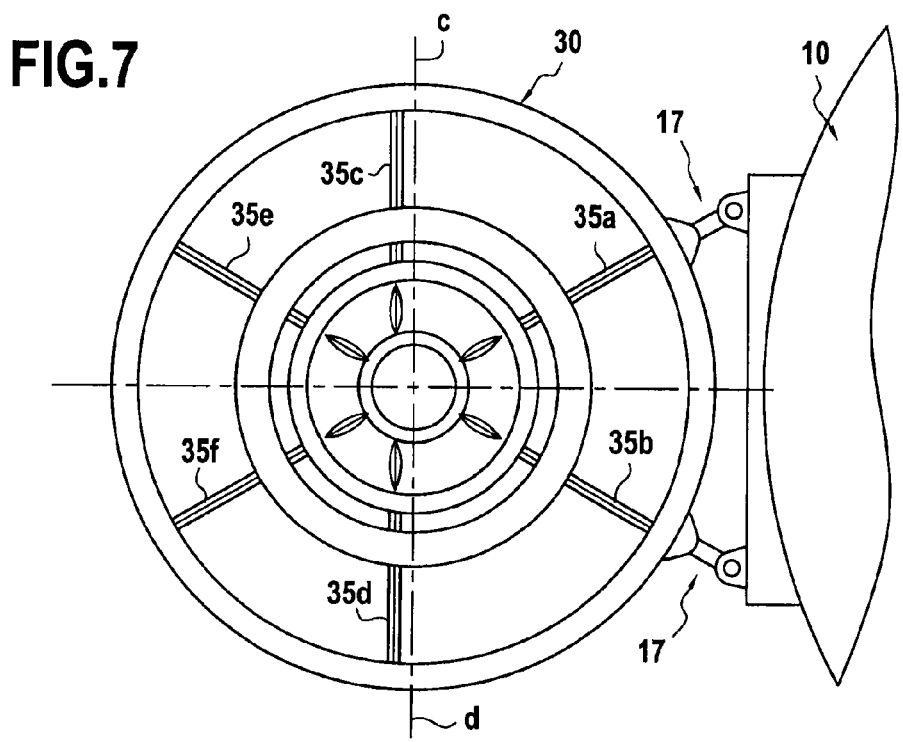
FIG. 7 is a view analogous to FIG. 4 showing yet another variant.

In another possibility, as shown in FIG. 7, some of the arms 35*c*, 35*d* are offset relative to their usual positions in which they are strictly radial. For example, it can be seen that each of these arms extends parallel to a corresponding radial direction c, d (i.e. the position it occupies on FIG. 3) on the other side of this radial direction relative to the attachment points of the front suspension 17. In contrast, the arms 35*a*, 35*b*, 35*e*, and 35*f* that extend radially relative to the attachment points are not offset.

In this variant, the arms may be of a right section that is symmetrical and closed. Nevertheless, any of the above-proposed solutions may be combined with one another, i.e. arms of different types may extend between the outer shroud of the intermediate casing and of the primary structure.

The invention claimed is:

1. A two-stream turbojet for attaching laterally to a fuselage of an airplane via two longitudinally spaced apart suspensions including a front suspension and a rear suspension, the turbojet comprising:
    an intermediate casing outer shroud attached to the front suspension; and
    a propulsion primary structure attached to the rear suspension;
    the intermediate casing outer shroud and the propulsion primary structure being held in a coaxial relationship by a set of arms, each arm including a right section that is hollow and being fastened by ends thereof to the intermediate casing outer shroud and to the propulsion primary structure; and
    wherein at least some of the arms include a C-shaped right section defined by a slot extending from the intermediate casing outer shroud to the propulsion primary structure, wherein in response to thrust from the turbojet, the C-shaped right section creates a deforming torque between the intermediate casing outer shroud and the propulsion primary structure, the deforming torque having a direction opposite to a bending moment that is generated under effect of the turbojet thrust by a force reaction couple at a thrust axis and the front suspension.

2. The turbojet according to claim 1, wherein the at least some of the arms are shaped and/or arranged to provide coupling between shear and twisting so that a center of torsion of a right section of the at least some of the arms is situated outside a midplane of the respective arm, on a side towards an opposite direction from the front suspension relative to the midplane.

3. The turbojet according to claim 1, wherein the slot is closed by an elastomer seal.

4. The turbojet according to claim 1, wherein certain arms extend radially in line with attachment points of the front suspension, and other arms extend parallel to a radius of the propulsion primary structure and the other arms are located, with respect to the radius, on a side towards an opposite direction from attachment points of the front suspension.

5. An intermediate casing comprising the intermediate casing outer shroud and arms configured to connect the intermediate casing outer shroud to the primary propulsion structure, the intermediate casing being arranged for fitting to a turbojet according to claim 1.

6. A two-stream turbojet for attaching laterally to a fuselage of an airplane by two longitudinally spaced apart suspensions including a front suspension and a rear suspension, the turbojet comprising:

an intermediate casing outer shroud attached to the front suspension and a propulsion primary structure attached to the rear suspension;

the intermediate casing outer shroud and the propulsion primary structure being held in a coaxial relationship by a set of arms, each arm being fastened via ends thereof to the intermediate casing outer shroud and to the propulsion primary structure; and wherein at least one of the arms is parallel and offset from a plane passing through a center axis of the propulsion primary structure to create a deforming torque between the intermediate casing outer shroud and the propulsion primary structure, the deforming torque having a direction opposite to a bending moment that is generated under effect of the turbojet thrust by a force reaction couple at a thrust axis and the front suspension.

7. The turbojet according to claim 6, wherein the at least one arm extends parallel to a corresponding radial direction on an other side of the radial direction relative to the plane on a side toward an opposite direction from attachment points of the front suspension, and wherein other arms of the set of arms extend radially in line with the attachment points of the front suspension.

8. The turbojet according to claim 6, wherein each of the arms includes a right section that is hollow.

9. The turbojet according to claim 6, wherein the arms include a right section that is symmetrical and closed.

10. A two-stream turbojet for attaching laterally to a fuselage of an airplane via two longitudinally spaced apart suspensions including a front suspension and a rear suspension, the turbojet comprising:

an intermediate casing outer shroud attached to the front suspension; and a propulsion primary structure attached to the rear suspension;

the intermediate casing outer shroud and the propulsion primary structure being held in a coaxial relationship by a set of arms, each arm including a right section that is hollow and being fastened by ends thereof to the intermediate casing outer shroud and to the propulsion primary structure; and wherein at least some of the arms include an approximately trapezoidal right section defined by a narrow side and an opposite wide side extending from the intermediate casing outer shroud to the propulsion primary structure, wherein the narrow side is located, with respect to the opposite wide side, towards attachment points of the front suspension, wherein in response to thrust from the turbojet, the approximately trapezoidal right section creates a deforming torque between the intermediate casing outer shroud and the propulsion primary structure, the deforming torque having a direction opposite to a bending moment that is generated under effect of the turbojet thrust by a force reaction couple at a thrust axis and the front suspension.

11. The turbojet according to claim 10, wherein the at least some of the arms are associated with respective fairings for improving streamlining thereof.

12. The turbojet according to claim 10, wherein the at least some of the arms are shaped and/or arranged to provide coupling between shear and twisting so that a center of torsion of a right section of the at least some of the arms is situated outside a midplane of the respective arm, on a side opposite on a side towards an opposite direction from the front suspension relative to the midplane.

13. The turbojet according to claim 10, wherein certain arms extend radially in line with attachment points of the front suspension, and other arms extend parallel to a radius of the propulsion primary structure and the other arms are located, with respect to the radius, on a side towards an opposite direction from the attachment points of the front suspension.

* * * * *